US011505749B2

(12) United States Patent
Booysen et al.

(10) Patent No.: US 11,505,749 B2
(45) Date of Patent: Nov. 22, 2022

(54) METHOD OF OPERATING A SLURRY BUBBLE COLUMN REACTOR

(71) Applicant: Sasol Technology Proprietary Limited, Johannesburg (ZA)

(72) Inventors: Willem Adriaan Booysen, Diepenheim (NL); Ruben Oortman, Enschede (NL)

(73) Assignee: SASOL TECHNOLOGY PROPRIETARY LIMITED, Johannesburg (ZA)

( * ) Notice: Subject to any disclaimer, the term of this patent is extended or adjusted under 35 U.S.C. 154(b) by 694 days.

(21) Appl. No.: 15/932,374

(22) PCT Filed: Aug. 10, 2016

(86) PCT No.: PCT/IB2016/054806
§ 371 (c)(1),
(2) Date: Feb. 16, 2018

(87) PCT Pub. No.: WO2017/029581
PCT Pub. Date: Feb. 23, 2017

(65) Prior Publication Data
US 2020/0283685 A1 Sep. 10, 2020

(30) Foreign Application Priority Data
Aug. 19, 2015 (ZA) .................... 2015/05974

(51) Int. Cl.
*C10G 2/00* (2006.01)
*B01J 8/22* (2006.01)

(52) U.S. Cl.
CPC ............. *C10G 2/342* (2013.01); *B01J 8/22* (2013.01); *B01J 2208/00548* (2013.01);
(Continued)

(58) Field of Classification Search
CPC .......... C10G 23/342; C10G 2300/4031; C10G 2/344
See application file for complete search history.

(56) References Cited

U.S. PATENT DOCUMENTS 2,987,465 A  6/1961 Johnanson
5,660,715 A * 8/1997 Trimble .................. B01J 8/125
                                                    208/158
(Continued)

*Primary Examiner* — Jafar F Parsa
(74) *Attorney, Agent, or Firm* — Mintz, Levin, Cohn, Ferris, Glovsky and Popeo, P.C.

(57) ABSTRACT

A method for starting a slurry bubble column reactor that includes a reactor vessel holding a settled or slumped bed of particles and a liquid phase from which the particles have settled includes introducing a flow of a re-suspension liquid into the settled or slumped bed to loosen the settled or slumped bed. The introduction of the re-suspension liquid takes place before the introduction of any gas into the settled or slumped bed, or together with feeding of gas into the settled or slumped bed, provided that, if gas is fed together with the re-suspension liquid into the settled or slumped bed before the settled or slumped bed has been loosened, the gas has a superficial gas velocity in the reactor below 10 cm/s. Once the settled or slumped bed has been loosened by at least the re-suspension liquid, gas is passed at a superficial gas velocity above 10 cm/s through the liquid phase.

16 Claims, 5 Drawing Sheets

(52) U.S. Cl.
CPC ........... *B01J 2208/00716* (2013.01); *B01J 2208/00911* (2013.01); *C10G 2300/4031* (2013.01)

(56) References Cited

U.S. PATENT DOCUMENTS

| | | |
|---|---|---|
| 6,512,017 B1 | 1/2003 | Steynberg et al. |
| 9,434,657 B2 | 9/2016 | Onishi et al. |
| 2005/0209351 A1 | 9/2005 | Mohedas et al. |
| 2010/0160460 A1* | 6/2010 | Soto ............... C10G 2/30 518/700 |
| 2016/0002541 A1* | 1/2016 | Ibsen ............. B01J 35/0033 518/719 |

* cited by examiner

METHOD OF OPERATING A SLURRY BUBBLE COLUMN REACTOR

This application is a national phase entry of Patent Cooperation Treaty Application No. PCT/IB2016/054806 filed Aug. 10, 2016, entitled "A METHOD OF OPERATING A SLURRY BUBBLE COLUMN REACTOR," which claims the benefit of priority to South African Application No. 2015/05974 filed on Aug. 19, 2015, entitled "METHOD OF OPERATING A SLURRY BUBBLE COLUMN," the disclosures of which are incorporated herein by reference in their entirety.

This invention relates to a method of operating a slurry bubble column reactor. In particular, the invention relates to a method for starting a slurry bubble column reactor.

Slurry bubble column reactors have superior heat transfer and temperature equalisation characteristics and also offer high production capacities in a single reactor. In slurry bubble column reactors, fine solids (typically catalyst particles usually smaller than 200 microns) are kept in suspension in a liquid phase or medium mainly or completely by turbulence created as gas bubbles rise through a slurry bed inside the reactor. A gas stream is typically introduced at or close to the bottom of the slurry bed. Slurry bubble column reactors typically operate with the slurry bed in the churn-turbulent hydrodynamic flow regime.

A different type of three-phase reactor to a slurry bubble column reactor is an ebullating bed reactor. Ebullating bed reactors are disclosed for example in re-issued U.S. Pat. No. 2,987,465 (re-issue 25,770). A mass of solid particles kept in a state of random motion by an upward flowing liquid phase is described as ebullated. Ebullating bed reactors typically operate in the well-mixed hydrodynamic flow regime at much lower gas velocities than slurry bubble column reactors. In ebullating bed reactors, co-currently upward flowing liquid phase and gas phase material contact a mass of solid particles in random motion within the reactor. Compared to slurry bubble column reactors, ebullating bed reactors usually employ larger catalyst particles; typically in the range of 100 to 5000 microns, preferably 350 to 3000 microns. It should be noted that in ebullating bed reactors, catalyst fluidisation is largely achieved by the flow of the liquid phase, whereas in slurry bubble column reactors it is largely the flow of gas phase that fluidises the catalyst particles.

U.S. Pat. No. 6,512,017 discloses a method of starting up a slurry bubble column reactor, said method including transferring clean molten wax to the reactor, establishing a gas flow through the liquid phase by recycling gas around the reactor, and then transferring a slurry of catalyst particles to the reactor. It further teaches a method a shutting down a slurry bubble column reactor that involves the steps of cutting a fresh syngas supply to the reactor so that the reactor is only operated under recycle, reducing the temperature to within the range of 150° C. to 200° C., and then transferring at least a portion of the slurry to an unloading vessel while maintaining gas flow through the reactor. Restarting of the reactor involves reloading of the catalyst slurry into the reactor according to the method followed for a normal reactor start-up. It yet further discloses a method of dealing with plant upsets, which method includes cutting fresh synthesis gas supply to the reactor so that the reactor is operated under recycle only, reducing the temperature to within the range of 150° C. to 200° C., and then transferring at least a portion of the slurry to an unloading vessel while maintaining gas flow through the reactor. The reactor is restarted by starting the syngas flow to the reactor, increasing the temperature and then reloading the unloaded catalyst portion back into the reactor. It yet further discloses a method of dealing with a failure of a gas recycle system around the reactor, said method including stopping fresh synthesis gas feed to the reactor, adding a quenching fluid to the reactor to decrease the temperature while optionally decreasing the pressure of the reactor, maintaining the temperature between 150° C. and 200° C., and optionally unloading some catalyst slurry from the reactor. The reactor is restarted by starting the recycle gas flow around the reactor until the settled catalyst bed has been re-suspended and the catalyst particles are in a state of fluidisation, whereafter fresh synthesis gas is also introduced.

EP 2692831 teaches a method of starting up a slurry bubble column Fischer-Tropsch reactor which involves first introducing and recycling an inert gas around the reactor in order to displace other gases and to fluidise the catalyst. In a second step, synthesis gas is introduced and recycled around the reactor to displace the inert gas and to maintain the catalyst in a state of fluidisation. In a final step, the fresh synthesis gas feed to the reactor is gradually increased to steady state operating conditions.

US 2005/0209351 relates to methods for prevention of and recovery from catalyst bed slumping or settling in a multiphase hydrocarbon synthesis reactor. The reactor contains a catalyst bed comprising catalyst particles and a gas injection zone suitable for injecting a reactor gas feed. The reactor is equipped with a reactor gas feed supply line and a supplementary gas feed line is connected to the reactor gas feed supply line. At the onset of a bed slumping event caused by gas flow below that required to disperse the catalyst particles, supplemental gas feed can be activated to prevent slumping of the catalyst bed. It further teaches that the gas injection zone be separated from the catalyst bed with a porous plate situated above the gas injection zone to prevent migration of the catalyst particles into the gas injection zone in the event that the bed does slump. Once the supply of reactor feed gas or of supplemental gas is sufficiently high to provide at least minimum fluidisation velocity, fluidisation of catalyst particles is resumed by the flow of gas passing through the porous plate.

Thus the prior art teaches start-up of slurry bubble column reactors using generic steps of forming a slurry of catalyst particles in a liquid medium inside a mixing vessel and transferring the slurry to the reactor while maintaining the catalyst in a state of fluidisation inside the reactor by means of a gas feed. There are also clear teachings in the prior art that de-fluidisation of catalyst particles during upset conditions, such as when the gas feed rate to the reactor is interrupted, should be avoided. Accordingly, the prior art teaches that a gas flow to the reactor be maintained (either via recycling gas around the reactor or gas from an external source) to keep the catalyst particles in suspension, and/or that at least a part of the slurry inventory of the reactor be transferred out of the reactor. Clearly, depending on the nature of the upset condition, such remedies may not always be practical and a situation may arise where the settling of the catalyst bed inside the reactor is unavoidable. In such a case, the prior art teaches that the bed should be re-suspended by starting gas flow to the reactor and, after achieving fluidisation of the catalyst, gradually approaching normal synthesis conditions.

In the past decades, commercial slurry bubble column reactors have become bigger in size. In order to increase single reactor capacity, the reactors can have diameters of several meters and the catalyst inventory may comprise hundreds of tons. Furthermore, a method to further increase the production capacity of a slurry bubble column reactor is to increase the catalyst concentration inside the reactor resulting in even higher catalyst loading.

Large scale slurry Fischer-Tropsch reactors can be successfully operated for several years without shutting down. However, routine maintenance shut-downs, necessary for inspections and repairs need to be conducted as scheduled. Unscheduled shut-downs of Fischer-Tropsch reactors can also occur. In shut-down situations the fluidisation of the catalyst in the slurry bed may be disrupted resulting in a slumped catalyst bed. As summarised above, when normal operation of the reactor is to be resumed the prior art teaches that the slumped catalyst bed be re-suspended by introducing gas to the reactor, be that synthesis gas or some other gas (e.g. an inert gas).

The Applicant unexpectedly discovered that high uplift forces approaching 200 kN/m² are experienced during bed re-suspension when performed in accordance with the prior art teaching. A method of re-suspending a settled or slumped catalyst bed in a slurry bubble column reactor which results in substantially lower uplift forces during bed re-suspension will be desirable.

According to the invention, there is provided a method for starting a slurry bubble column reactor that includes a reactor vessel holding a settled or slumped bed of particles and a liquid phase from which the particles have settled, the method including introducing a flow of a re-suspension liquid into the settled or slumped bed to loosen the settled or slumped bed, the introduction of the re-suspension liquid taking place before the introduction of any gas into the settled or slumped bed, or together with feeding of gas into the settled or slumped bed, provided that, if gas is fed together with the re-suspension liquid into the settled or slumped bed before the settled or slumped bed has been loosened, the gas has a superficial gas velocity in the reactor below 10 cm/s; and once the settled or slumped bed has been loosened by at least the re-suspension liquid, passing gas at a superficial gas velocity above 10 cm/s through the liquid phase.

As is well known to those skilled in the art of operation of slurry bubble column reactors, the gas flows upwardly through the liquid phase, from a low level at which the gas is introduced, e.g. at or near a bottom of the reactor vessel.

In this specification, superficial gas velocity or superficial liquid velocity is defined as respectively the gas or liquid volumetric flow rate at the pressure and temperature conditions of the reactor vessel divided by the cross-sectional area of the empty reactor vessel. This definition applies to both a cold model setup (e.g. as used in laboratory scale experiments) and to actual installed or designed reactors (e.g. commercial slurry Fischer-Tropsch reactors).

In normal use or at steady state operation, when a slurry bed is maintained, the particles, i.e. solids, are held in suspension in the liquid phase by turbulence created as gas passes upwardly through the slurry bed. Consequently the particles settle when the gas flow is reduced to low values or stopped. The slurry bubble column reactor is in normal use typically, but not necessarily always, operated with the slurry bed inside the reactor vessel in the churn-turbulent flow regime. This flow regime is characterised by a dilute phase consisting of fast-rising large gas bubbles which traverse the slurry bed upwardly virtually in plug flow, and a dense phase comprising liquid phase, solid particles and entrained smaller gas bubbles.

Preferably, the mean diameter of the particles determined on a volumetric basis is less than about 200 microns, more preferably less than about 100 microns, most preferably below about 80 microns. Typically, about 90% of particles on a volume basis have diameters below about 200 microns, more preferably below about 100 microns, most preferably below about 80 microns.

The settled or slumped bed of particles in the reactor vessel may have a height or depth of at least about 2.5 m, or at least about 5 m, or even at least about 7 m, e.g. at least about 10 m. The weight of the solids in such a settled bed may be as high as about 850 000 kg.

Typically the slurry bubble column reactor has a gas distributor at a low level inside the reactor vessel for introducing gas feed into the reactor vessel. The gas distributor in use will typically introduce gas feed at a level that is below or within the settled bed height. Not wishing to be bound by theory, the Applicant believes that the settled bed is compacted into a plug and that gas introduced at a low level into the reactor vessel displaces this plug upwards. High forces are required to shear the plug. Upward displacement of the plug consequently results in large forces being exerted on reactor internals. By feeding a re-suspension liquid, the plug is weakened as a result of the loosening of the settled or slumped bed, so avoiding large forces being exerted on reactor internals.

The slurry bubble column reactor may be used for Fischer-Tropsch synthesis and may thus be a Fischer-Tropsch slurry bubble column reactor. The particles will then include solid Fischer-Tropsch catalyst particles. The liquid phase will then typically comprise hydrocarbon liquid product of the Fischer-Tropsch synthesis.

The re-suspension liquid may be any suitable liquid. The re-suspension liquid may stay mainly in the liquid phase after being introduced into the reactor vessel, i.e. into the settled or slumped bed, or the re-suspension liquid may partially or fully vaporise after introduction. Preferably the re-suspension liquid stays mainly in the liquid phase after being introduced into the settled or slumped bed. In cases where the slurry-bubble column reactor vessel contains catalyst particles, the re-suspension liquid should preferably be substantially free of substances that have an adverse effect on the performance of the catalyst, e.g. the re-suspension liquid should preferably be substantially free of catalyst poisons. In case of Fischer-Tropsch synthesis, the re-suspension liquid preferably is or comprises a product obtained or derived from the Fischer-Tropsch synthesis, such as diesel or wax produced by or derived from the Fischer-Tropsch synthesis.

The re-suspension liquid preferably has a viscosity of less than about 10 cP, more preferably less than about 4 cP, at the temperature of the settled or slumped bed in the reactor vessel.

Similarly, the viscosity of the liquid phase in the slurry bubble-column reactor vessel should also be considered. The method therefore typically includes, prior to the introduction of the flow of the re-suspension liquid, ensuring that the liquid phase in the reactor is at a temperature such that the liquid phase has a viscosity of less than about 10 cP, preferably less than about 4 cP. This may include heating the reactor vessel, i.e. contents of the reactor vessel.

In cases where the slurry bubble-column reactor is employed in Fischer-Tropsch synthesis, the liquid phase typically includes waxy hydrocarbon products of the Fischer-Tropsch synthesis. The reactor vessel is then typically heated to a temperature of at least about 150° C. prior to the introduction of the re-suspension liquid. Should the reactor vessel cool down too much, where the temperature approaches the congealing point of Fischer-Tropsch wax for example, it is possible to have a sufficiently high viscosity to cause higher up-lift forces compared to those observed when lower viscosity liquids are used. It is therefore recommended to prevent excessive cooling of the reactor vessel during shut-down periods.

Experimental data shows that the up-lift forces increase substantially with an increase in the viscosity of the re-suspension liquid. A re-suspension liquid with a viscosity of 2.4 cP behaves similarly to a re-suspension liquid with a viscosity of 1 cP with only minimal increase in the uplift forces. However, with a re-suspension liquid with a viscosity around 140 cP the uplift forces may increase 3 to 4 times.

The flow of re-suspension liquid may be introduced into the settled or slumped bed with any suitable fluid introduction means, such as a distributor or sparger. Preferably the fluid introduction means is designed uniformly to distribute the re-suspension liquid across a reactor vessel cross section.

Preferably, the volume of the re-suspension liquid introduced into the settled or slumped bed prior to the introduction of gas at a superficial velocity of above 10 cm/s is at least about 5% of an interparticle volume of the settled or slumped bed, more preferably at least about 15% of the interparticle volume of the settled or slumped bed and most preferably at least about 30% of the interparticle volume of the settled or slumped bed. In one embodiment of the invention, the slumped or settled bed is thus considered to be loosened by the re-suspension liquid, or by a combination of the re-suspension liquid and gas at a superficial gas velocity below 10 cm/s, when the volume of re-suspension liquid fed into the settled or slumped bed is at least about 5% of the interparticle volume of the settled or slumped bed, more preferably at least about 15% of the interparticle volume of the settled or slumped bed and most preferably at least about 30% of the interparticle volume of the settled or slumped bed.

Preferably the flow of the re-suspension liquid introduced into the settled or slumped bed has a superficial liquid velocity in the reactor vessel that is greater than the minimum fluidisation velocity of the particles of the settled or slumped bed in the liquid phase in the reactor vessel.

As mentioned hereinbefore, the superficial liquid velocity of the re-suspension liquid is determined by dividing the total liquid volumetric flow of the re-suspension liquid by the cross sectional area of the reactor vessel. In case of Fischer-Tropsch synthesis, the flow of the re-suspension liquid is preferably introduced at a superficial liquid velocity in the reactor vessel of at least about 0.4 mm/s, more preferably at least about 0.5 mm/s and most preferably at least about 0.8 mm/s.

Within the scope of this invention it is possible to either stop or maintain the flow of the re-suspension liquid after gas is introduced into the reactor vessel.

As mentioned hereinbefore, the method may include, subsequent to or simultaneously with introducing the flow of the re-suspension liquid into the settled or slumped bed, feeding a gas to the settled or slumped bed at a gas superficial velocity in the reactor below 10 cm/s. This gas may be considered to be a start-up gas. The use of a start-up gas may potentially assist with loosening of the settled or slumped bed and may assist in starting re-suspending the slumped bed gradually.

The start-up gas superficial velocity in the reactor vessel is preferably not more than about 5 cm/s, more preferably not more than about 2 cm/s. If start-up gas is used, the feeding of the start-up gas is preferably maintained for at least about 3 minutes, more preferably at least about 10 minutes and most preferably at least about 15 minutes before introducing gas at a superficial velocity above 10 cm/s.

The re-suspension liquid and the start-up gas may share one or more fluid introduction means (i.e. may be introduced or fed into the reactor vessel through the same introduction or feeding means), or may have separate fluid introduction or feeding means.

The start-up gas may be introduced so that feeding of the start-up gas overlaps with the flow of the re-suspension liquid, or the start-up gas may be introduced only after the flow of the re-suspension liquid has stopped.

The start-up gas may be any suitable gas. In cases where the slurry bubble-column reactor vessel contains catalyst particles, the start-up gas should preferably be substantially free of substances that have an adverse effect on the performance of the catalyst, e.g. it should preferably be substantially free of catalyst poisons. The start-up gas is preferably an inert gas, such as nitrogen. Alternatively, the start-up gas can be the same or similar to a reactor feed gas or a gas rich in hydrogen, e.g. synthesis gas.

When the start-up gas is the same as or is similar to a reactor feed gas, or when the start-up gas is a gas rich in hydrogen, the method may include maintaining the temperature of the reactor vessel, i.e. the temperature of contents of the reactor vessel, below an onset temperature of the reaction during loosening of the settled or slumped bed to inhibit or avoid heat generation or consumption from the reaction. Typically, slurry bubble column reactors are used for exothermic reactions.

For Fischer-Tropsch synthesis, the reactor vessel temperature during re-suspension should preferably be sufficiently high to prevent the full or partial congealing of the liquid medium inside the reactor vessel, but low enough to avoid significant heat generation from chemical reaction, i.e. from hydrocarbon synthesis. Therefore, in case of Fischer-Tropsch synthesis a reactor vessel temperature typically between about 150° C. and about 200° C. is desirable during re-suspension of the settled bed.

The method of the invention may include gradually increasing the flow rate of the start-up gas to a superficial gas velocity in the reactor vessel above 10 cm/s.

The slurry bed reactor may include slurry redistribution means or slurry redistributors in the reactor vessel. In this specification, the term "slurry redistribution means" or "slurry redistributors" is intended to refer to physical apparatus used to redistribute slurry and catalyst particles vertically inside the reactor vessel, and does not refer to the slurry and catalyst particle redistribution action of the gas passing upwards through the slurry bed. The slurry redistribution means may thus include downcomers or draught tubes or mechanical redistribution apparatus such as pipes and pumps and filters. Preferably the slurry redistributors include downcomers. The downcomers allows slurry to pass downwardly from a high level in the slurry bed to a lower level thereof, thereby to redistribute heat, liquid phase and catalyst particles within the slurry bed.

Each downcomer may comprise a lower transport section and an upper disengagement or degassing section of greater cross-sectional area than the transport section. The sections are preferably circular in cross-section, is of cylindrical form, with an outwardly upwardly flaring connecting component connecting the disengagement section to the transport section. However, the disengagement section can, if desired, be in another suitable form, e.g. in the form of a rectangular or triangular section channel, as determined by the space available inside the reactor vessel.

The invention will now be described and illustrated in more detail and by way of example with reference to the experiments set out below and the accompanying diagrammatic drawings.

IN THE DRAWINGS

Figure 1:
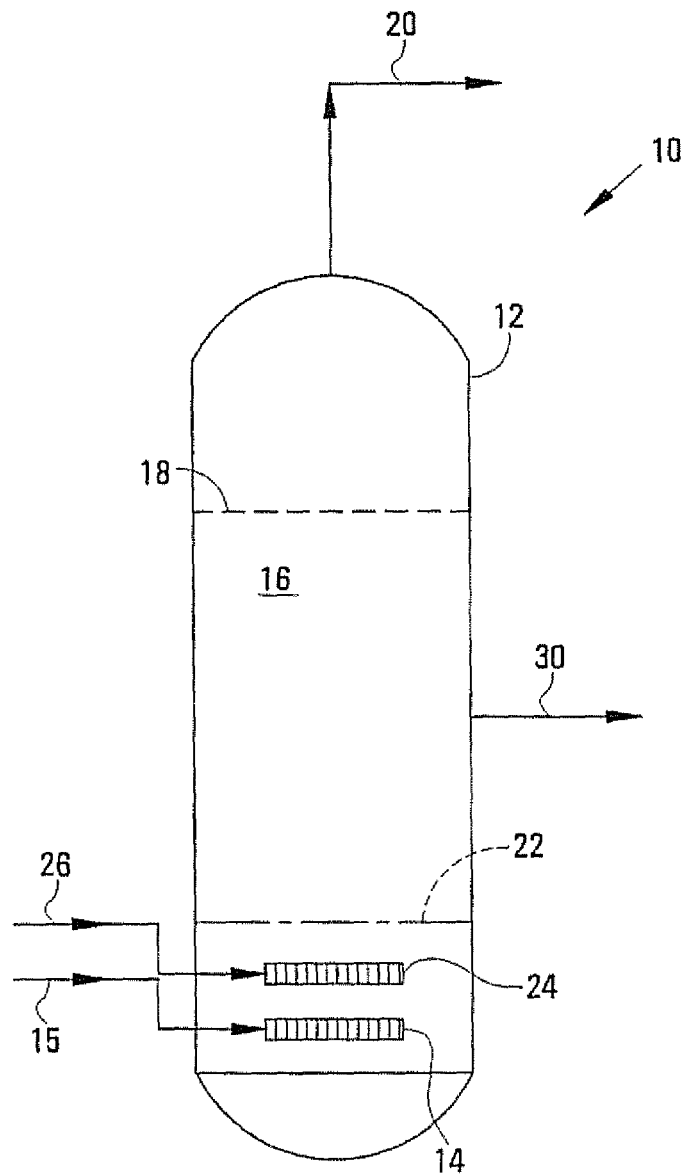
FIG. 1 shows a schematic view of a slurry bubble column reactor.

With reference to FIG. 1 of the drawings, reference numeral 10 generally indicates an apparatus for implementation of the method in accordance with the invention. The apparatus 10 includes an upright cylindrical Fischer-Tropsch slurry bubble column reactor vessel 12 having a gas sparger, generally indicated by reference numerical 14, at a low level in the reactor vessel 12. The gas sparger 14 is connected to a gas supply line 15. The reactor vessel 12 also has a re-suspension liquid sparger, generally indicated by reference numeral 24, at a low level in the reactor vessel 12. Instead of a single re-suspension liquid sparger 24, multiple re-suspension liquid spargers (not shown) may also be implemented. The sparger 24 is connected to a re-suspension liquid supply line 26. A gas outlet line 20 and a liquid withdrawal line 30 lead from the reactor vessel 12.

In normal use, the reactor vessel 12 contains a slurry bed 16 of catalyst particles suspended in a liquid medium (typically liquid product of the Fischer-Tropsch reaction). Feed gas (including synthesis gas) supplied along the gas inlet line 15 is distributed into the slurry bed 16 by the sparger 14. The catalyst particles are held in suspension mainly by the turbulence created as feed gas and gaseous products pass upwardly through the slurry bed. The slurry bed 16 is operated in the churn-turbulent flow regime. This flow regime is characterised by a dilute phase comprising of fast-rising large gas bubbles which traverse the slurry bed 16 upwardly virtually in plug flow, and a dense phase comprising liquid phase, solid catalyst particles and entrained smaller gas bubbles. Typically, 90% of particles on a volume basis have diameters below 200 microns, more preferably below 100 microns and most preferably below 80 microns.

The reactor vessel 12 is typically maintained at an operating pressure of between about 10 bar and about 40 bar and at an operating temperature of between about 180° C. and about 280° C. During normal operation, feed gas (synthesis gas) from the gas supply line 15 is introduced into the reactor vessel 12 typically at superficial gas velocities above about 30 cm/s, maintaining the slurry bed. As the feed gas passes upwardly through the slurry bed 16, the catalyst particles catalyse the reaction of synthesis gas to form a range of products in accordance with known Fischer-Tropsch reactions. The products include gaseous and liquid products. The slurry bed 16 has an upper level 18 above which gaseous products and unreacted feed gas accumulates in a head space of the reactor vessel 12. This gas is evacuated through the gas outlet line 20 for further processing or for recycling. As liquid product is formed, the level 18 of the slurry bed is maintained by the withdrawal of liquid along the liquid withdrawal line 30.

In the event that the feed gas flow along the gas inlet line 15 is reduced to low values or stopped for any reason, the slurry bed 16 settles or slumps. Under the influence of gravity, the catalyst particles settle out of the liquid phase and collect at the bottom of the reactor vessel 12 forming a settled or slumped bed of catalyst particles. The settled bed extends up to a settled bed level indicated by broken line 22 in FIG. 1. The interparticle volume of the settled bed can be determined by subtracting the actual volume of the catalyst particles in the reactor vessel 12 from the volume of the reactor vessel 12 up to the settled bed level 22, i.e. by subtracting the actual volume of catalyst particles from the actual volume occupied by the settled catalyst particles. As the gas sparger 14 is located at a low level in the reactor vessel 12, the settled bed level 22 is above the gas sparger 14. Not wishing to be bound by theory, the Applicant believes that the settled bed is compacted into a plug and that gas introduced using the gas sparger 14 displaces this plug upwards. High forces are then transferred to internals of the reactor vessel 12 (e.g. cooling coils, that are not shown, and the gas sparger 14) in order to shear the plug.

In accordance with the method of the invention, re-suspension of the settled bed is performed by introducing a flow of a re-suspension liquid, and not simply by re-introducing gas flow as taught by the prior art. The flow of the re-suspension liquid is supplied along the re-suspension liquid line 26 and introduced into the reactor vessel 12, i.e. into the slumped or settled bed, through the liquid sparger 24. The sparger 24 is located at a low level in the reactor vessel 12 and below the settled bed level 22, so that the re-suspension liquid is fed into the settled or slumped bed.

The liquid sparger 24 is preferably positioned as low in the reactor vessel 12 as practically possible. In one of the embodiments of this invention (not shown), the liquid sparger 24 is positioned below the gas sparger 14. The re-suspension liquid can also be introduced to the reactor vessel 12 at more than one level using additional liquid spargers (not shown) positioned along the height of the settled bed. It is also possible to introduce the re-suspension liquid using the gas sparger 14.

The re-suspension liquid flow is maintained at least until the amount of re-suspension liquid injected into the settled or slumped bed is greater than the amount of liquid needed to loosen the bed, calculated from the interparticle volume of the slumped catalyst bed, e.g. at least about 5%, preferably at least about 10% and most preferably at least about 30% of the interparticle volume. At this point, in one embodiment of the invention, gas is introduced into the reactor vessel 12 at a superficial velocity of more than 10 cm/s through the gas sparger 14.

EXAMPLES

Experiments were performed in cold model columns operating at ambient pressure and room temperature. The columns, with internal diameters of 38 cm and 15 cm respectively, were charged with glass beads (more than 90% of which was smaller than 100 μm on a volumetric basis) and water to form slurry. These columns were used to study uplift forces in settled beds of particles under different operating conditions. In the 15 cm internal diameter column research was also performed with actual oxidised Fischer-Tropsch catalyst particles and paraffinic liquid mediums representative of Fischer-Tropsch wax at Fischer-Tropsch operating conditions. The uplift forces were measured with the aid of a free hanging structure installed in the columns and connected to load cells. The free hanging structure was placed at a low level in the columns so that it was submerged in the settled bed. The load cells measure the mass force (kg) which was converted to an area corrected force (N) with the following equation:

$$\text{Force (N)} = \frac{9.81 \, (\text{Sensor mass reading}_{Peak\ value} \, [\text{kg}] - \text{Sensor mass reading}_{Start} \, [\text{kg}])}{\text{Cross sectional area in axial direction of internal connected to load cell } [\text{m}^2]}$$

The 38 cm internal diameter column was equipped with a main sparger installed at a low level in the column. A secondary sparger was installed above the main sparger and was sometimes used for introducing re-suspension fluids into the column.

The steady state flow rate of air to the column (i.e. the analogy of the reactor feed gas flow rate of a reactive system) was a superficial gas velocity of at least 10 cm/s inside the column in all experiments on both columns.

Example 1: Effect of Settled Bed Height

Figure 2:
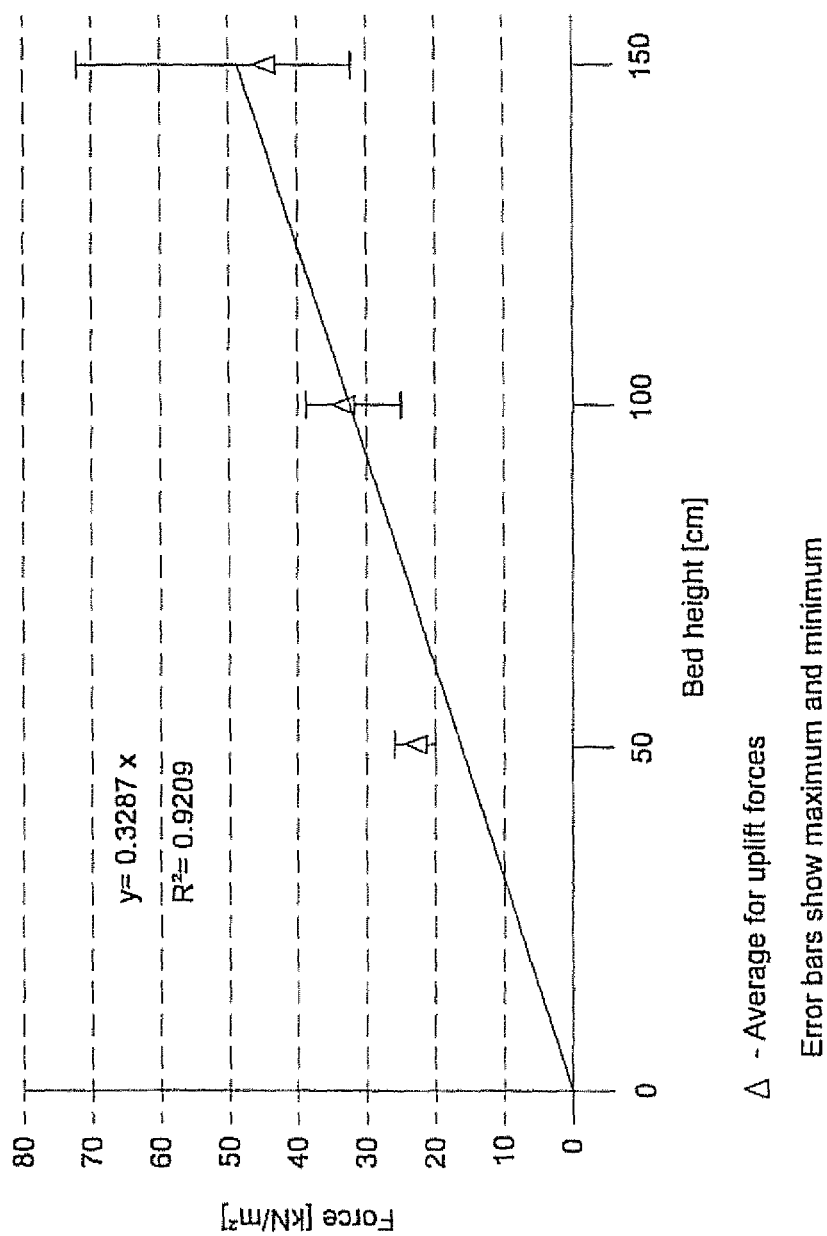
FIG. 2 shows a diagram illustrating the effect of a settled bed height on uplift forces.

Experiments were performed in the column where the glass beads were allowed to settle out from a fluidised state by shutting off the air flow to the column. The air flow was then restored to the column by opening the automated valve (opening at a rate of 0.15%/s), allowing air to be introduced into the column through the main sparger, i.e. the settled bed was re-suspended by a method that falls within the scope of the prior art teachings. The maximum uplift force measured during the re-suspension of the settled bed was recorded. By using different amounts of glass beads, the effect of different settled bed heights varying from 0.5 m to 2.5 m could be investigated. For each settled bed height, a number of experiments were performed and the average values, as well as the range of measured values, are reported in FIG. 2 for each height.

The average values indicate a strong increase in the uplift force with an increasing settled bed height. Furthermore, the experiments became much less reproducible the higher or deeper the settled catalyst bed, i.e. the range of values measured became broader as the settled bed height increased. It is arguably more important to consider the highest value recorded at each height studied rather than the average, since the highest value represents the event that can cause the most damage to an actual large scale slurry Fischer-Tropsch reactor vessel. This shows that increasing the catalyst load in an actual large scale slurry reactor vessel, which will result in a higher settled bed during process upsets, can significantly increase the risk of damaging reactor internals if the prior art procedure to start up a reactor with a normal production gas flow is followed to re-suspend a settled catalyst bed.

Example 2: Effect of the Amount of Re-Suspension Liquid Expressed as a Fraction of the Settled Bed Interparticle Volume Experiments were performed in the column where the glass beads were suspended in water at high superficial gas velocities of above 30 cm/s for about 45 minutes. The gas flow was stopped and the glass beads were allowed to settle for at least 2 hours. After the bed had settled completely, i.e. all particles had settled out, the bed was re-fluidised by first introducing a re-suspension liquid flow to the column through the secondary sparger at a superficial liquid velocity of 0.5 mm/s. While still continuing to pump the re-suspension liquid through the secondary sparger, the gas flow at a superficial gas velocity of 10 cm/s was introduced to the column through the main sparger.

Figure 3:
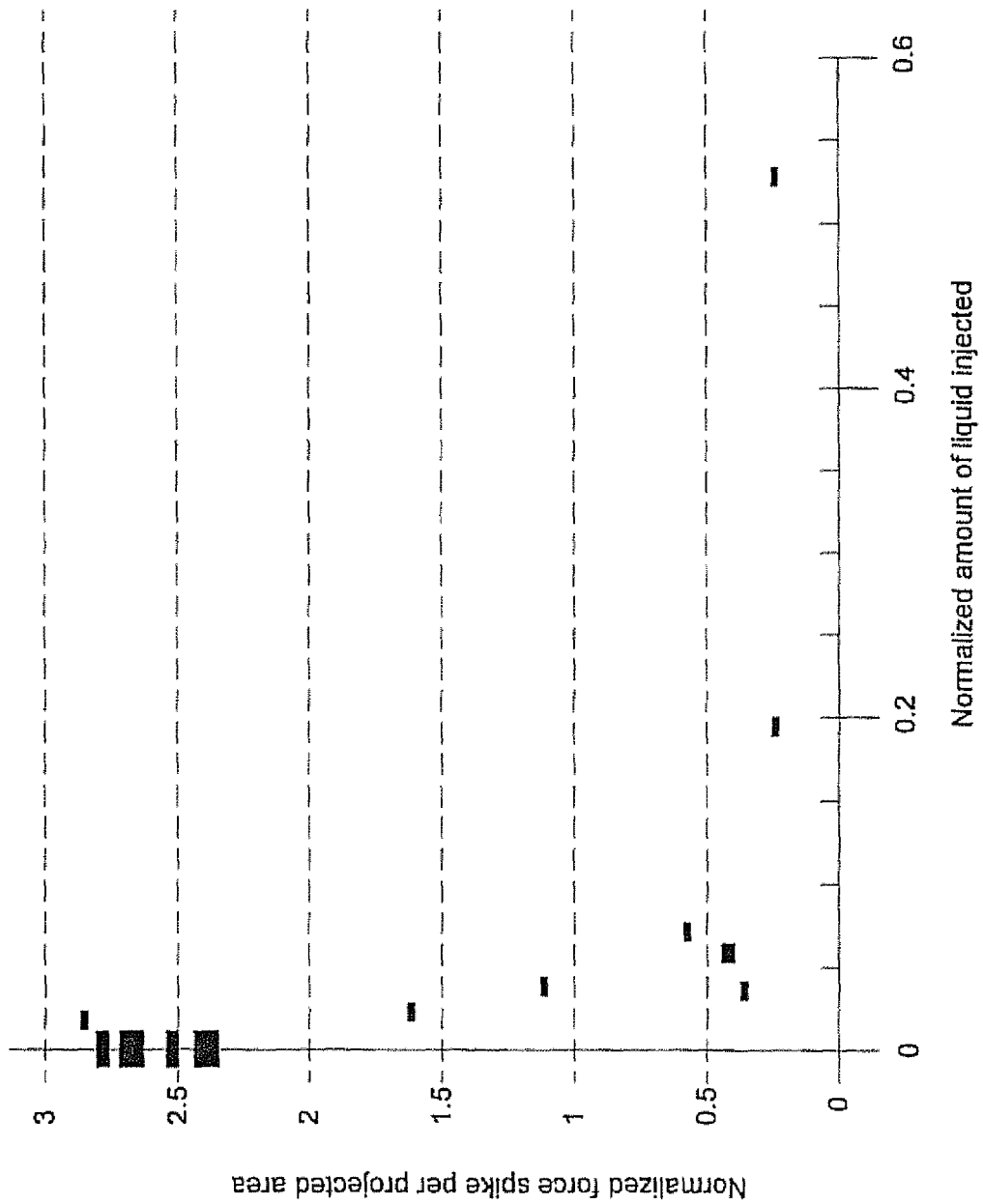
FIG. 3 shows a diagram illustrating the effect of the volume of a re-suspension liquid injected into a settled bed on uplift forces.

From FIG. 3 it is evident that there is an exponential decrease in the uplift forces with the amount of re-suspension liquid injected. A substantial decrease in the measured uplift forces is observed when the amount of re-suspension liquid injected is at least equal to 20% to 30% of the settled bed interparticle volume (see FIG. 3).

The values of the uplift force spikes were normalized by dividing the values obtained experimentally in Example 2 by the mean uplift force value obtained when the start-up was performed using a gas only.

Example 3: Start-Up Procedure Involving First Feeding Re-Suspension Liquid, then a Start-Up Gas at a Low Flow Rate and then Commencing the Feed Gas Flow Rate In these experiments, the glass beads were allowed to settle out from a fluidised state by shutting off the air flow to the column. After the bed had settled completely, i.e. all particles had settled out, the bed was re-fluidised by first introducing a re-suspension liquid flow to the column through the secondary sparger for a certain period of time. Immediately thereafter, a start-up gas was introduced into the column through the secondary sparger at a low flow rate, i.e. a flow rate less than 10 cm/s. Following this, the normal feed gas flow (superficial gas velocity of 10 cm/s) was introduced through the main sparger. The maximum bed uplift force measured during the start-up procedure was recorded.

For a superficial liquid velocity of 0.8 mm/s fed to the column for about 160 seconds, followed by a start-up gas flow at a superficial gas velocity of 1.5 cm/s for 15 minutes before starting the normal gas flow, the uplift forces measured on the free hanging internal during start-up were almost completely eliminated.

Figure 4:
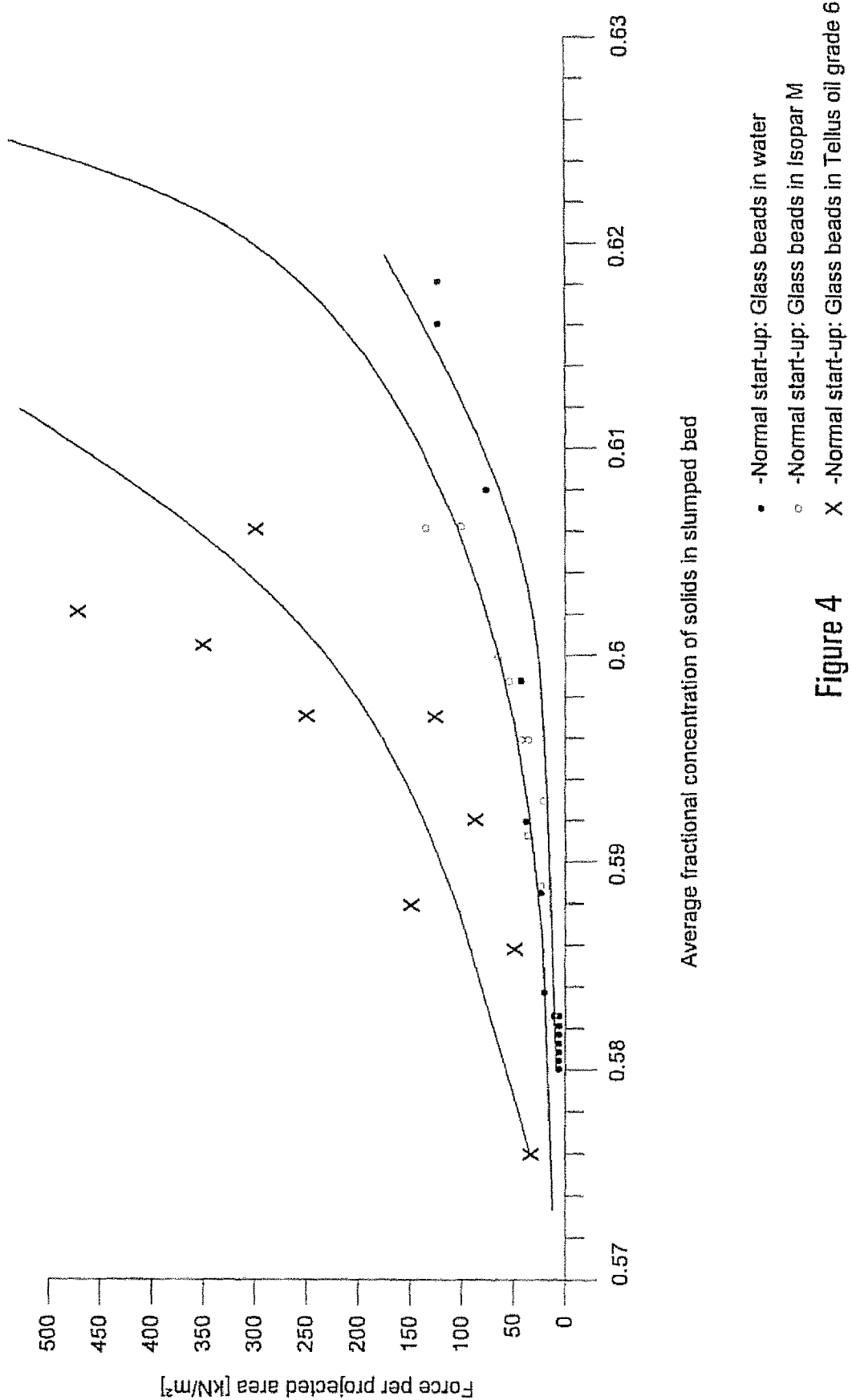
FIG. 4 shows a diagram illustrating the effect of the viscosity of a re-suspension liquid on uplift forces.

Example 4: Effect of the Re-Suspension Liquid Viscosity on the Uplift Forces Three different liquids have been used to investigate the impact of liquid viscosity on the uplift forces. Water with a viscosity of about 1 cP, an Isopar M paraffin with viscosity around 2.4 cP and Tellus oil grade 68 with viscosity of 138 cP were used in experiments. Water and Isopar M were used for most of the experimental work and similar results have been obtained for the uplift forces with the two liquids. For the extreme scenario, uplift forces were measured for highly viscous Tellus oil. For the same bed packing density much higher uplift forces were measured with Tellus oil, as illustrated in FIG. 4. These experiments therefore show that the viscosity of the re-suspension liquid is important as higher viscosity liquid will produce higher uplift forces.

Example 5: Correlation Between Results Obtained with Glass Beads and with Catalyst In these experiments the uplift forces generated using oxidised cobalt Fischer-Tropsch catalyst particles were compared with the uplift forces generated using a glass bead system for similar bed heights. The selected glass beads have a similar particle size distribution to the oxidised cobalt catalyst. Similar to the experiments described above, the catalyst particles and glass beads were allowed to settle out from a fluidised state by shutting off the air flow to the column. After the bed had settled completely, i.e. all particles had settled out, the bed was re-fluidised by first introducing a re-suspension liquid flow to the column through the main distributor for a certain period of time. Immediately thereafter, a start-up gas was introduced into the column through the main distributor.

Figure 5:
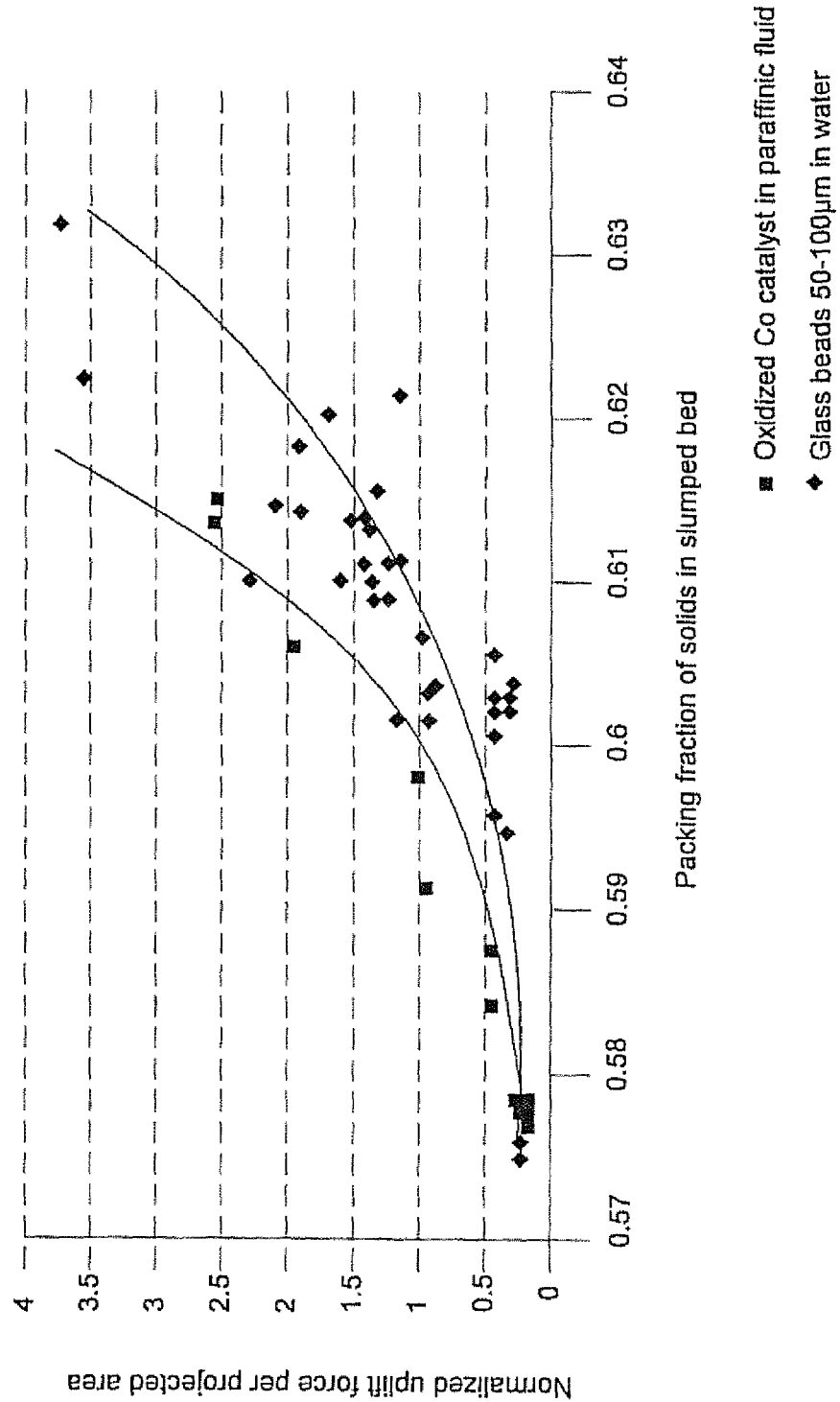
FIG. 5 shows a diagram illustrating correlation between uplift forces per projected area obtained with glass beads and commercial catalyst.

As can be seen from FIG. 5, good agreement exists between the results generated when using actual catalyst and when using glass beads with a similar particle size distribution. Therefore it can be concluded that the results obtained in experiments conducted with the system where glass beads were used can be applied to a similar system using a commercial catalyst, such as a commercial Fischer-Tropsch catalyst.

The invention, as illustrated, advantageously allows re-suspension of a settled or slumped catalyst bed in a slurry bubble column reactor vessel without introducing large uplift forces, e.g. uplift forces approaching 200 kN/m$^2$, to the reactor vessel and/or internals of the reactor vessel. In some embodiments of the invention, the method of the invention can advantageously employ existing apparatus, such as a gas sparger, to introduce a flow of a re-suspension liquid to the settled or slumped bed, and/or employ a re-suspension liquid which can remain in the slurry bubble column reactor vessel as part of the liquid phase of the slurry bed after operation of the reactor vessel with a re-constituted slurry bed has commenced.

The invention claimed is:

1. A method for starting a slurry bubble column reactor that includes a reactor vessel holding a settled or slumped bed of particles and a liquid phase from which the particles have settled, the method including:
   introducing a flow of a re-suspension liquid into the settled or slumped bed to loosen the settled or slumped bed, the introduction of the re-suspension liquid taking place before the introduction of any gas into the settled or slumped bed, or together with feeding of gas into the settled or slumped bed, provided that, if gas is fed together with the re-suspension liquid into the settled or slumped bed before the settled or slumped bed has been loosened, the gas has a superficial gas velocity in the reactor below 10 cm/s; and
   once the settled or slumped bed has been loosened by at least the re-suspension liquid, passing gas at a superficial gas velocity above 10 cm/s through the liquid phase.

2. The method according to claim 1, wherein the slurry bubble column reactor is used for Fischer-Tropsch synthesis and wherein the particles include solid Fischer-Tropsch catalyst particles.

3. The method according to claim 1, wherein the re-suspension liquid has a viscosity of less than 10 cP at the temperature of the settled or slumped bed in the reactor vessel.

4. The method according to claim 3, wherein the re-suspension liquid has a viscosity of less than 4 cP at the temperature of the settled or slumped bed in the reactor vessel.

5. The method according to claim 1, which includes, prior to the introduction of the flow of the re-suspension liquid, ensuring that the liquid phase in the reactor vessel is at a temperature such that the liquid phase has a viscosity of less than 10 cP.

6. The method according to claim 5, which includes, prior to the introduction of the flow of the re-suspension liquid, ensuring that the liquid phase in the reactor vessel is at a temperature such that the liquid phase has a viscosity of less than 4 cP.

7. The method according to claim 1, wherein the volume of the re-suspension liquid introduced into the settled or slumped bed prior to the introduction of gas at a superficial velocity of above 10 cm/s is at least 5% of an interparticle volume of the settled or slumped bed.

8. The method according to claim 7, wherein the volume of the re-suspension liquid introduced into the settled or slumped bed prior to the introduction of gas at a superficial velocity of above 10 cm/s is at least 15% of the interparticle volume of the settled or slumped bed.

9. The method according to claim 1, wherein the flow of the re-suspension liquid introduced into the settled or slumped bed has a superficial liquid velocity in the reactor vessel that is greater than the minimum fluidisation velocity of the particles of the settled or slumped bed in the liquid phase in the reactor vessel.

10. The method according to claim 1, which includes introducing the flow of the re-suspension liquid into the settled or slumped bed to loosen the settled or slumped bed together with feeding of gas into the settled or slumped bed, said gas being a start-up gas with a superficial gas velocity in the reactor below 10 cm/s.

11. The method according to claim 10, wherein the start-up gas has a superficial gas velocity in the reactor vessel which is not more than 5 cm/s.

12. The method according to claim 10 or claim 11, which includes gradually increasing the flow rate of the start-up gas to a superficial gas velocity in the reactor vessel above 10 cm/s.

13. The method according to claim 10, wherein the start-up gas is an inert gas.

14. The method according to claim 10, wherein the start-up gas is the same as or is similar to a reactor feed gas, or wherein the start-up gas is a gas rich in hydrogen, the method including maintaining the temperature of the reactor vessel below an onset temperature of the reaction during loosening of the settled or slumped bed to inhibit or avoid heat generation or consumption from the reaction.

15. The method according to claim 2, wherein the flow of the re-suspension liquid is introduced at a superficial liquid velocity in the reactor vessel of at least 0.4 mm/s.

16. The method according to claim 7, wherein the volume of the re-suspension liquid introduced into the settled or slumped bed prior to the introduction of gas at a superficial velocity of above 10 cm/s is at least 30% of the interparticle volume of the settled or slumped bed.

* * * * *